(12) United States Patent
Brown (10) Patent No.: US 6,766,090 B2
(45) Date of Patent: Jul. 20, 2004

(54) SIGNAL TRANSMITTING CABLE WITH OUTER COVERING THAT FACILITATES INSTALLATION IN A DUCT BY FLUID FLOW

(75) Inventor: George Henry Platt Brown, Galashiels (GB)

(73) Assignee: Emtelle UK Limited (GB)

( * ) Notice: Subject to any disclaimer, the term of this patent is extended or adjusted under 35 U.S.C. 154(b) by 0 days.

(21) Appl. No.: 10/239,123

(22) PCT Filed: Feb. 22, 2001

(86) PCT No.: PCT/GB01/00742

§ 371 (c)(1),
(2), (4) Date: Jan. 13, 2003

(87) PCT Pub. No.: WO01/73494

PCT Pub. Date: Oct. 4, 2001

(65) Prior Publication Data

US 2003/0095762 A1 May 22, 2003

(30) Foreign Application Priority Data

Mar. 29, 2000 (GB) .............................................. 0007443
Feb. 14, 2001 (GB) .............................................. 0103584

(51) Int. Cl.[7] ............................ G02B 6/02; G02B 6/22; G02B 6/44
(52) U.S. Cl. ........................ 385/128; 385/100; 385/127
(58) Field of Search ................................ 385/127, 100, 385/128

(56) References Cited

U.S. PATENT DOCUMENTS

| 5,293,442 A | | 3/1994 | Sayegh | |
|---|---|---|---|---|
| 5,533,164 A | * | 7/1996 | Preston et al. | 385/128 |
| 5,557,703 A | * | 9/1996 | Barker et al. | 385/128 |

FOREIGN PATENT DOCUMENTS

| EP | 0 345 968 A2 | 12/1989 |
|---|---|---|
| EP | 0 345 968 A3 | 8/1990 |
| EP | 0 422 764 A2 | 4/1991 |
| EP | 0 422 764 A3 | 2/1992 |
| EP | 0 521 710 A1 | 1/1993 |
| EP | 0 646 818 A1 | 4/1995 |
| EP | 0 752 604 A1 | 1/1997 |
| JP | 04186206 | 7/1992 |
| WO | WO 97/03376 | 1/1997 |
| WO | WO 99/35525 | 7/1999 |

* cited by examiner

Primary Examiner—Chandrika Prasad
(74) Attorney, Agent, or Firm—Daniel B. Schein, Esq.

(57) ABSTRACT

An optical fibre cable (1) for installation in a duct by means of fluid flow is described. The cable (1) has a signal transmitting portion comprising a plurality of elongate, flexible optical fibres, surrounded by a braided covering (10) formed from textile yarns (9).

16 Claims, 7 Drawing Sheets

Notes
2 Laps
Total Distance 1,040m
All bends are radius > 4m unless stated otherwise Key

| | |
|---|---|
| Duct | ——— |
| Field Boundary | —·— |
| Start | △ |
| Finish | ○ |
| Severe Bend | ● |

FIG. 4

| Bend Details | | | | |
|---|---|---|---|---|
| Lap | Bend Identifier | Cumulative Distance from | Details | Diagram |
| One | A | 132 | 90°, radius 1.1m | |
| | B | 230 | 90°, 180°, 90° radius=0.4m, h=2.2m | |
| | C | 440 | 90°, 180°, 90° radius=0.4m, h=4.5m | |
| Two | A | 652 | 90°, radius 1.1m | |
| | B | 750 | 90°, 180°, 90° radius=0.4m, h=2.2m | |
| | C | 960 | 90°, 180°, 90° radius=0.4m, h=4.5m | |

TABLE 1

SIGNAL TRANSMITTING CABLE WITH OUTER COVERING THAT FACILITATES INSTALLATION IN A DUCT BY FLUID FLOW

The present invention relates to signal transmitting cables for installation in ducts, and relates particularly, but not exclusively, to optical fibre light signal transmitting cables for installation into underground ducts or into buildings.

It is common to transmit telecommunication signals by means of optical fibre cables installed in underground ducts. In order to minimise the number of persons needed to install such cables, and therefore minimise the installation cost, it is known to install cables consisting of bundles of flexible optical fibres into ducts by means of compressed air. An end of the cable is inserted into one end of a duct, and the cable is then blown into the duct by means of compressed air, fluid drag between the moving air and the surface of the cable causing the cable to move axially along the duct. It is known to provide such cables consisting of optical fibres encapsulated in a thin plastic sheath, which is then encapsulated in a thicker foam plastic layer. The foam plastic layer makes the cable relatively light in weight but provides it with a large surface area, giving good fluid drag as air passes over it in the installation process.

However, cables of this type, known to persons skilled in the art as MKI cables, suffer from the drawback that because the cable is relatively large in diameter, it is necessary to use a large diameter duct for installation of the cable in order to achieve commercially acceptable installation distances. In the case of telecommunication cables being installed in duct networks, especially in city centre locations where space in underground ducts is scarce because of the very high number of customers and the high cost of construction, it is undesirable to use large ducts. In addition, MKI cables usually use polyethylene foam outer layers, which have relatively poor friction characteristics when in contact with the internal surface of the installation tube, which in turn restricts the blowing distances achievable with this product.

An attempt to solve this problem, known to persons skilled in the art as a MKII cable, is disclosed in international patent application No. WO 93/01512, UK patent application No. GB22822897, and European patent application Nos. EP 0422764, EP 0752604 and EP 0345968. In this type of cable, the optical fibres are coated in a two stage process, and the outer layer contains microscopic glass spheres designed to provide a rough surface to enhance fluid drag, while providing a low friction contact surface between the optical fibre cable and the tube. The use of microscopic glass spheres means that the outer layer can be significantly thinner than the foam outer layer of the MKI cable, and the improved friction performance means that this type of prior art cable can be installed over commercially satisfactory distances in smaller diameter ducts.

However, there has persisted a commercial requirement for optical fibre cables which are capable of installation by blowing over longer distances than are possible with the MKII cable, since if the number of optical fibre splices in a cable network can be reduced, the installation time and cost can be reduced and the process can be made suitable for a wider range of applications.

Preferred embodiments of the present invention seek to provide a signal transmitting cable which can be blown into a duct over longer distances than in the prior art.

According to an aspect of the present invention, there is provided a signal transmitting cable for installation in a duct by means of fluid flow, the cable comprising:

a signal transmitting portion comprising at least one elongate, flexible, signal transmitting member; and a covering formed of crossed continuous textile fibres surrounding said signal transmitting portion.

The highly surprising result has been found that by applying a covering formed of crossed continuous textile fibres on the cable, exceptional and dramatic improvements in blowing distances can be achieved. Furthermore, the present invention has been found to provide improved abrasion resistance and crush resistance compared with prior art signal transmitting cables under certain circumstances. This provides the advantage that cables of the invention may under certain circumstances be used in an unprotected arrangement free of a duct which would not be practicable in the case of prior art cables, for example the use of fibre optic cables in a building outside of the duct.

At least one said signal transmitting member is preferably an optical signal transmitting member.

The at least one of said optical transmitting member may be an optical fibre.

At least one said signal transmitting member may be a conductor for transmitting an electrical signal.

In a preferred embodiment, the covering is braided.

It has been found that braided textile coverings provide exceptionally good blowing performance. It is believed that this is the case because the braided fibres provide a lightweight, rough outer coating to increase fluid drag, while also providing low friction contact points with the inner surface of a duct into which the cable is blown.

The covering may include fibres of different lateral thicknesses.

The covering may include fibres of different diameters.

It has been found that under certain circumstances, this provides the advantage that even better blowing performance can be achieved. It is believed that the provision of crossing points of fibres of larger and smaller diameter produces larger protrusions on the outer surface of the cable than in the case of fibres of generally equal diameters, which in turn minimises the points of contact (and therefore the friction) between the cable and the internal surface of a duct into which the cable is blown.

The covering includes a mixture of fibres of substantially flattened and substantially circular cross sections.

The covering may be woven.

The covering may be knitted

The textile fibres may include polyester and/or nylon.

The cable may further comprise at least one sheath surrounding at least one said signal transmitting member.

In a preferred embodiment, the cable comprises a plurality of said signal transmitting members, and an adhesive layer arranged between at least one pair of adjacent said signal transmitting members.

The covering may be provided with a friction reducing coating.

The fibres of said coating may be provided with a friction reducing coating.

At least one said fibre may be formed from a plurality of filaments.

According to another aspect of the invention, there is provided a method of forming a signal transmitting cable for installation in a duct by means of fluid flow, the method comprising:

forming a covering of crossed continuous textile fibres around a signal transmitting portion comprising at least one elongate, flexible, signal transmitting member.

The step of forming said covering may comprise braiding said continuous textile fibres The step of forming said covering may comprise forming said covering from textile fibres of different lateral thicknesses.

The step of forming said covering may comprise forming said covering from textile fibres of different diameters.

The step of forming said covering may comprise forming said covering from a mixture of fibres of substantially flattened and substantially circular cross section.

The method may further comprise the step of providing said covering with a friction reducing coating subsequently to formation thereof.

The method may further comprise the step of providing at least some of said textile fibres with a friction reducing coating prior to formation of said covering.

Preferred embodiments of the invention will now be described, by way of example only and not in any limitative sense, with reference to the accompanying drawings, in which.

Figure 1:
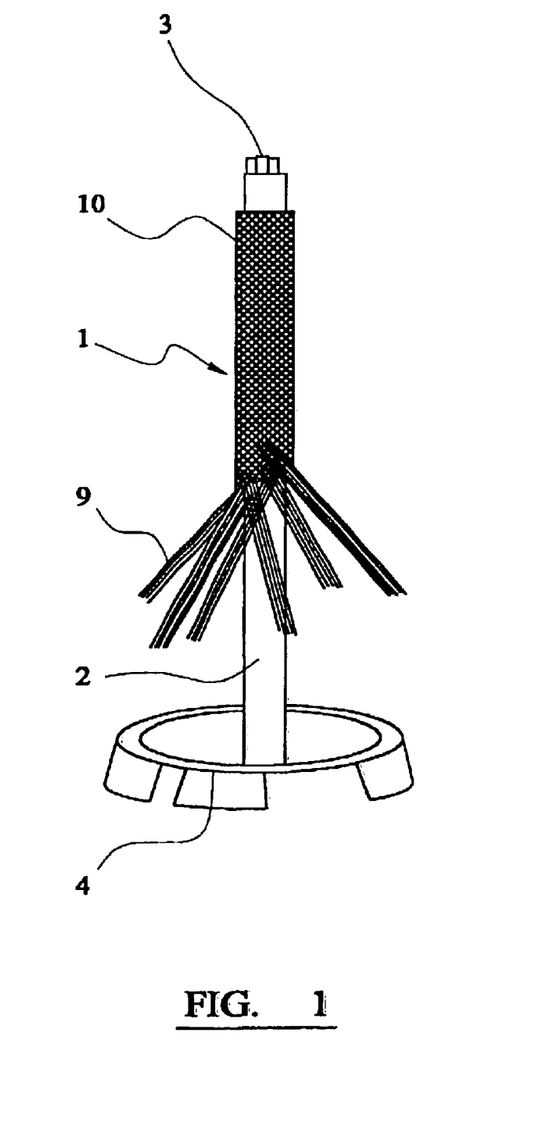
FIG. 1 is an elevation view of a fibre optic cable of a first embodiment of the present invention.

Referring to FIG. 1, an optical fibre cable 1 of a first embodiment of the invention is made by taking a cable containing twelve optical fibres 3, encapsulated in a plastic sheath 2, for example a prior art MKII cable manufactured in accordance with the process described in the prior art documents mentioned above. The fibre bundle is pulled from a fibre pan through an orifice 4 of a braiding head (not shown) having two counter-rotating sinusoidal tracks, as will be familiar to persons skilled in the art.

The braiding head is provided with counter rotating sinusoidal tracks, each of which carries yarn carriers carrying textile yams, the yams being arranged in an intertwined configuration, and is provided with an eyelet arranged centrally above the yam carriers. The yarns are passed though the eyelet to converge and are then passed through geared capstans to form a braid known as a maypole braid. In the arrangement shown in FIG. 1, the braiding head uses twelve yarns of equal thickness, each of which is 140 D/tex high tenacity continuous multifilament polyester yarn, and would operate to produce a braided covering 10 on the cable by means of gears (in a manner familiar to persons skilled in the art) to produce 17 picks (or crossings) of the yarns 9 per inch.

Figure 2:
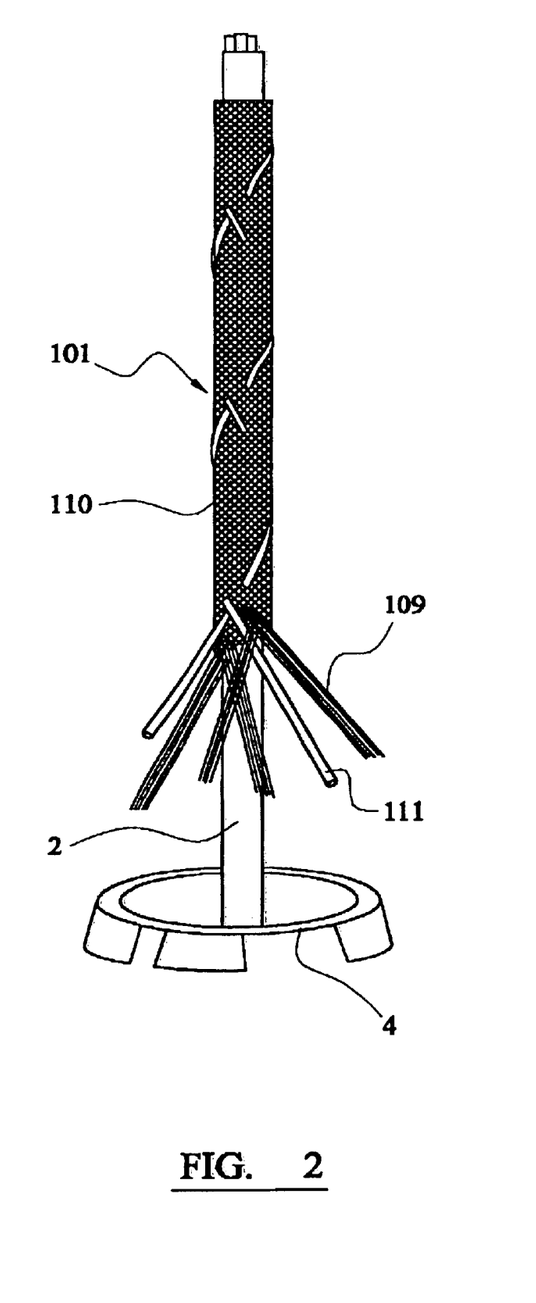
FIG. 2 is an elevation view, corresponding to FIG. 1, of a fibre optic cable of a second embodiment of the present invention.

Referring to FIG. 2, in which parts common to the embodiment of FIG. 1 are denoted by like reference numerals but increased by 100, a fibre optic cable 101 is formed by forming a braided coating 110 on a conventional MKII fibre optic bundle 2 in a similar manner to the process described with reference to FIGS. 1 and 3, but the braided coating 110 contains a mixture of light multifilaments 109 and heavy monofilaments 111. Instead of using twelve fibres of 140 D/tex multifilament, ten fibres of such multifilament are used, and two 180 Denier continuous monofilament nylon yarns. The 180 Denier yarn is approximately three times the lateral thickness of the 140 D/tex multifilament.

COMPARATIVE EXAMPLE 1

Figure 3:
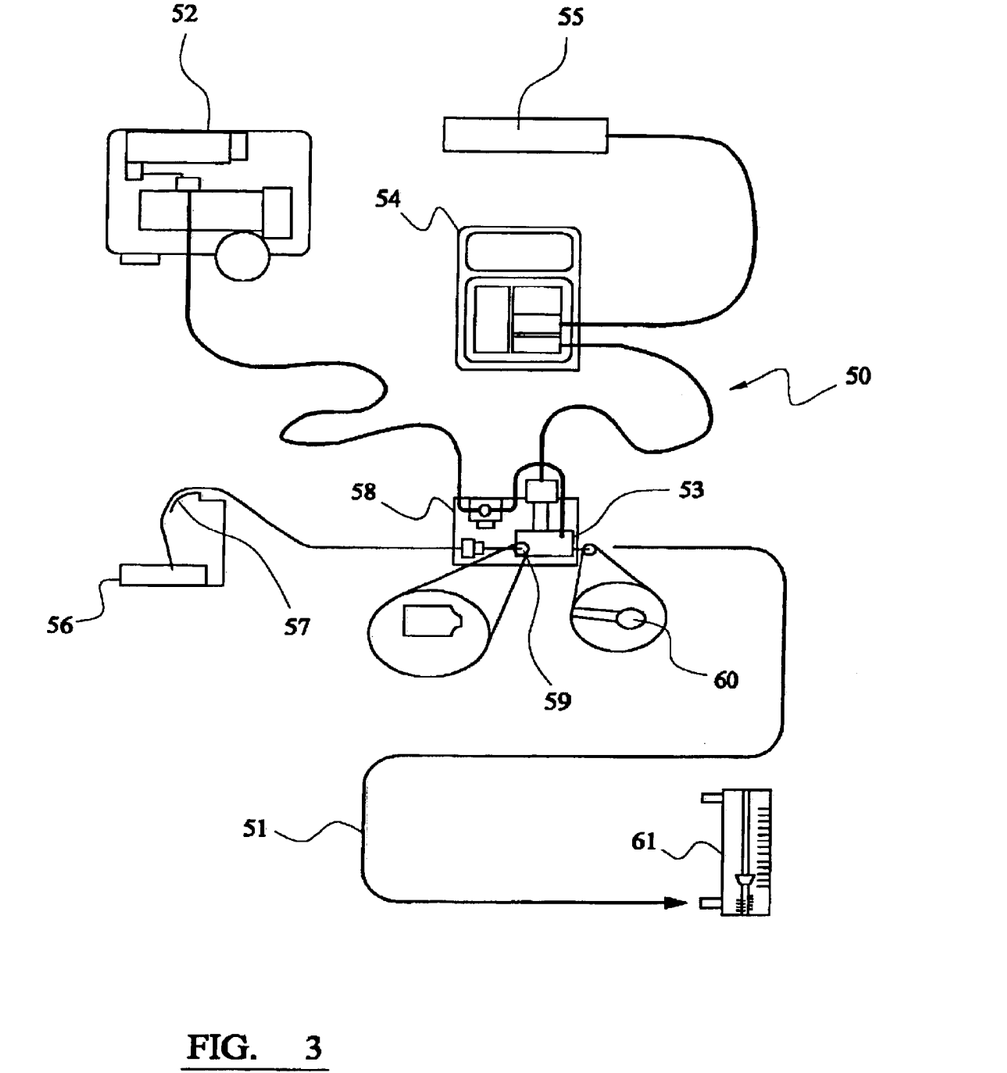
FIG. 3 is a schematic view of an apparatus for use in blowing the cables of FIGS. 1 and 2 into a duct.

FIG. 3 shows an apparatus 50 for installing the fibre optic cable 1, 101 of FIGS. 1 and 2 into a duct 51. The apparatus 50 includes an air compressor 52 for supplying a blowing head 53 with a conditioned air supply substantially free of static electricity or moisture. The blowing head 53 includes drive wheels (not shown), the speed of rotation of which (and hence the speed of installation of the fibre cable 1, 101) is adjusted by means of a control unit 54 powered by power supply 55. The fibre cable 1, 101 is fed from a fibre pan 56 over guide 57 to the blowing head 53, which is fed with an air supply from compressor 52 which is regulated by dispenser 58.

The blowing head 53 is also provided with a seal 59 to minimise air leakage through the back of the blowing head during installation, and a blowing bead 60 is attached to the forward end of the fibre cable 1, 101 before blowing, to guide the fibre through any connectors and sharp bends of the duct 51, which is clamped to the blowing head 53. A flow meter 61 is provided at the end of the duct 51 remote from the blowing head 53 to measure the rate of air flow.

Figure 4:
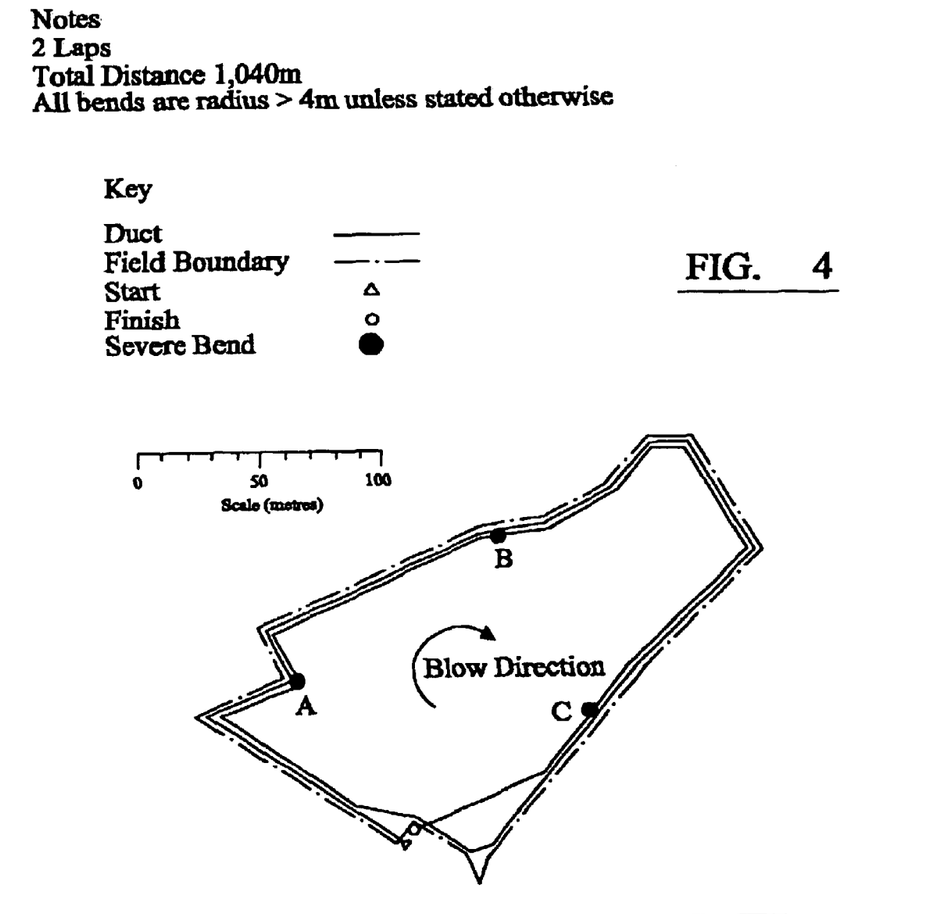
FIG. 4 is a schematic illustration of a track used in Comparative Example 1.

Referring now to FIG. 4, 1 km lengths L1 of the fibre cable 1 of FIG. 1, and L2 of the fibre cable 101 of FIG. 2 were blown through a duct 51 of outside diameter 5 mm and inside diameter 3.5 mm along two laps of the route shown. Table 1 provides details of bends provided on the track. An uncoated MKII fibre optic L3cable was also blown along the same route.

Figure 5:
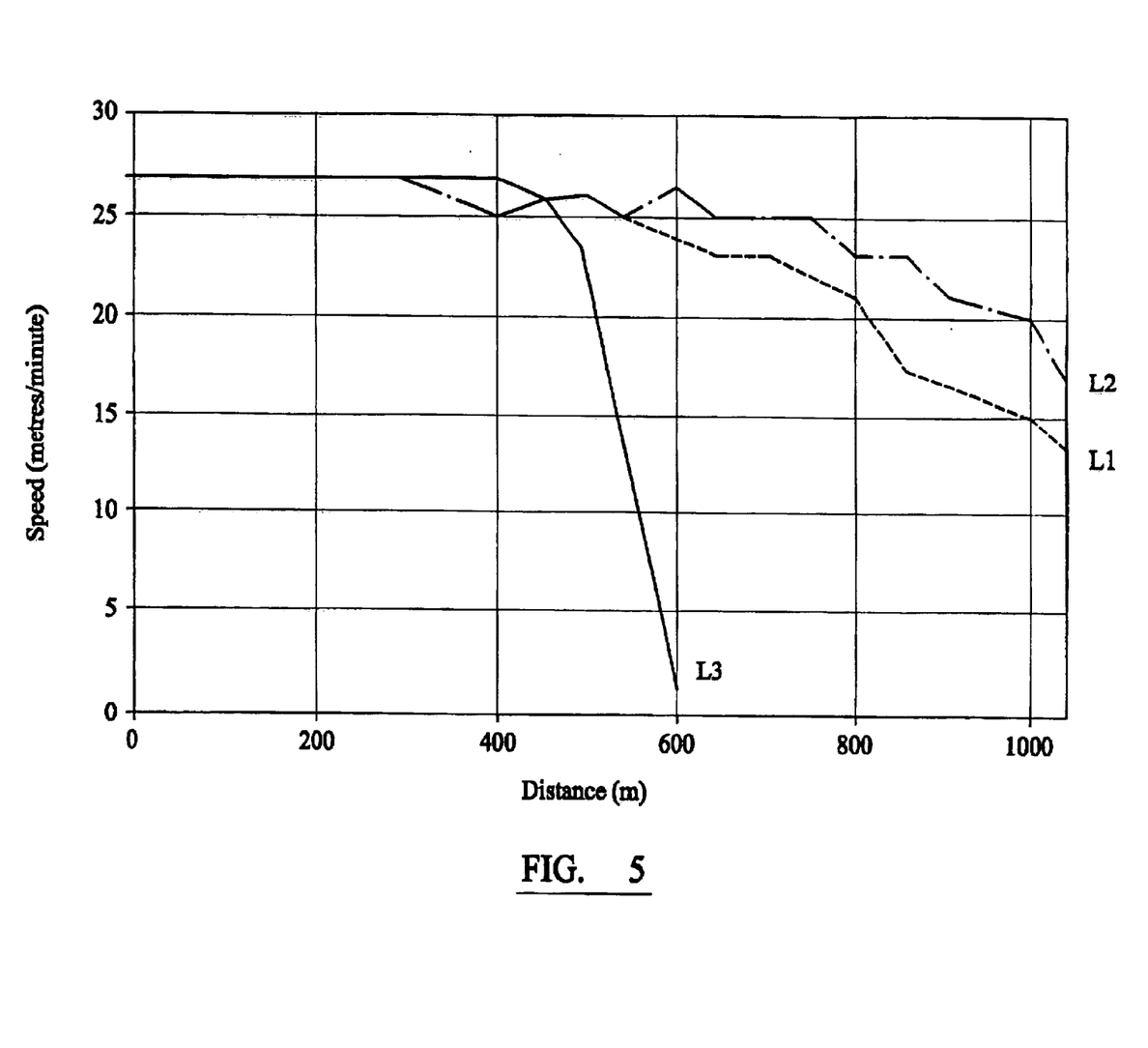
FIG. 5 is a graph of comparative blowing performance in Comparative Example 1.

FIG. 5 shows the results of blowing performance, on which curve L3 shows that the installation speed of the conventional MKII fibre optic cable started to reduce after an installation distance of approximately 400 m, and then rapidly declined. Curve L1, on the other hand, shows that the fibre optic cable 1 of FIG. 1 was still travelling with an installation speed of 15 m per minute after a blowing distance of 1000 m, and curve L2 shows that the cable 101 of FIG. 2 achieved even better blowing performance. Comparing FIGS. 4 and 5, it can be seen from curve L3 that the conventional cable failed to be blown significantly past point C in FIG. 4, where a 180 degree bend was provided between two 90 degree bends. The cables of the present invention, on the other hand, were blown past this point without difficulty. It can therefore be seen that providing a covering of braided textile fibres of equal thickness on a fibre optic cable dramatically improves its ability to be blown into a duct by means of compressed air, and a coating of braided fibres of mixed thicknesses improves the blowing performance further still.

Figure 6:
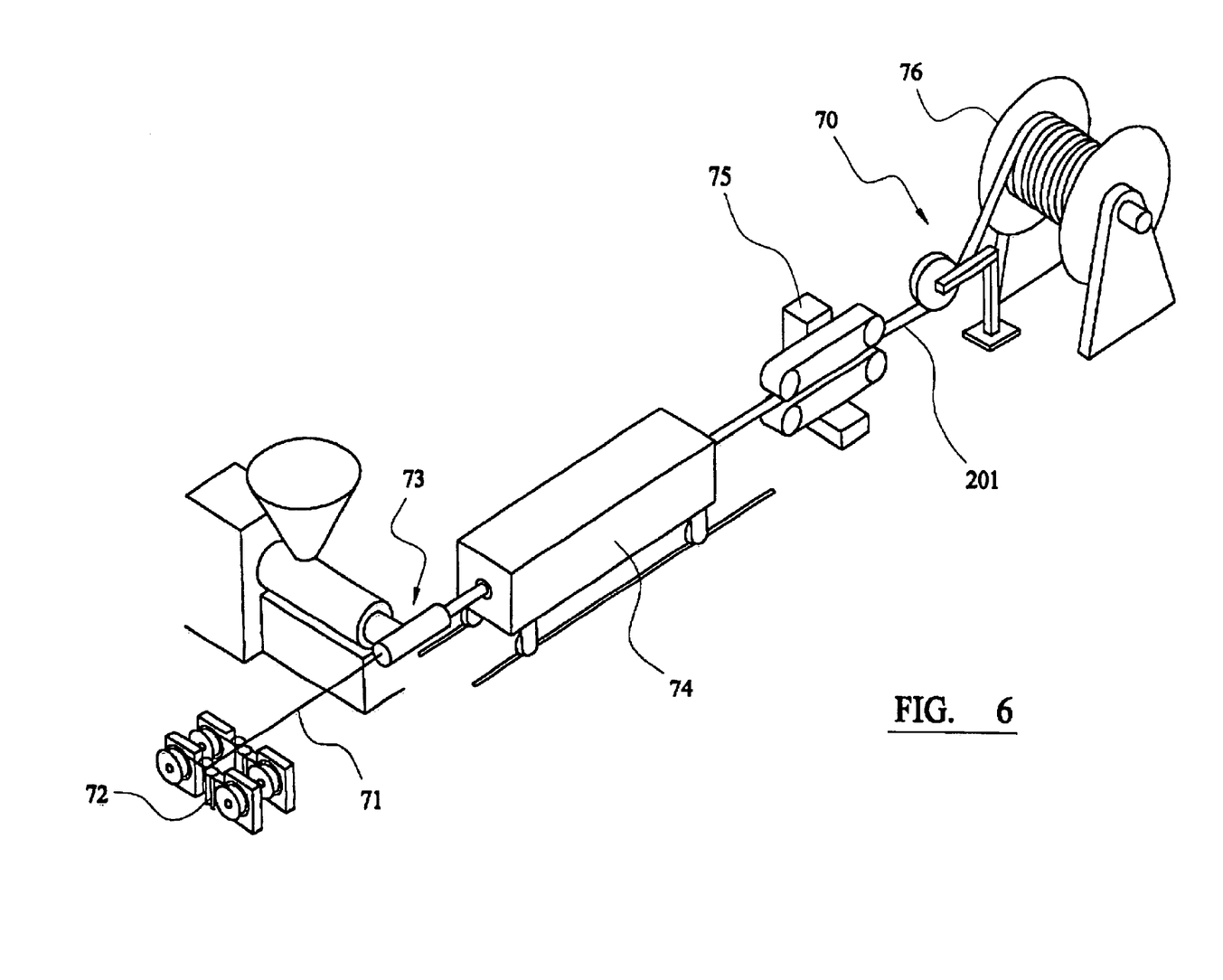
FIG. 6 is a schematic perspective view of an apparatus used in manufacturing fibre optic cable of a third embodiment of the present invention.

FIG. 6 shows an apparatus 70 for manufacturing a fibre optic cable of a third embodiment of the invention. Four reels of commercially available single mode optical fibre 71 were installed on fibre pay-off units 72 and passed through a cross head die 73 where they were tightly coated with a thin layer (100 micron thickness) of polypropylene. The polypropylene coated fibres 201 were then passed through a water cooling trough 74 and a haul-off unit 75 and were taken up on a reel 76. Equipment for carrying out this process is available from Nextrom Technologies, of Helsinki, Finland, and will be familiar to persons skilled in the art. The fibre optic bundle was then coated with a braided textile fibre as shown in FIG. 1.

COMPARATIVE EXAMPLE 2

Figure 7:
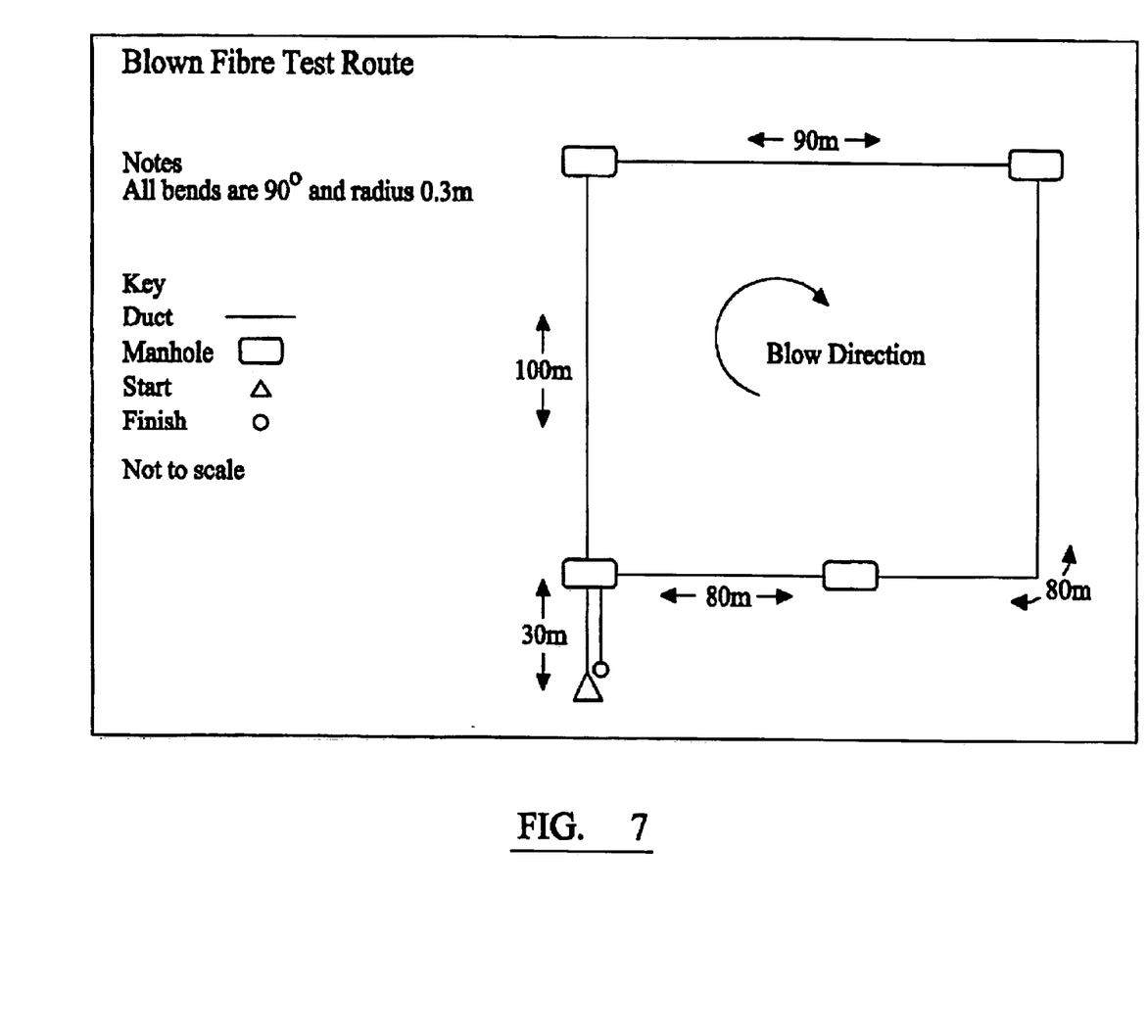
FIG. 7 is a schematic illustration of a track used in Comparative Example 2.

The fibre optic cable 201 thus formed was blown into a test route as shown in FIG. 7, consisting of three circuits of the track shown. The blowing was carried out by means of apparatus as shown in FIG. 3. A conventional MKII fibre optic cable containing an equal number of optical fibres to the cable 201 was also blown along the same route.

Figure 8:
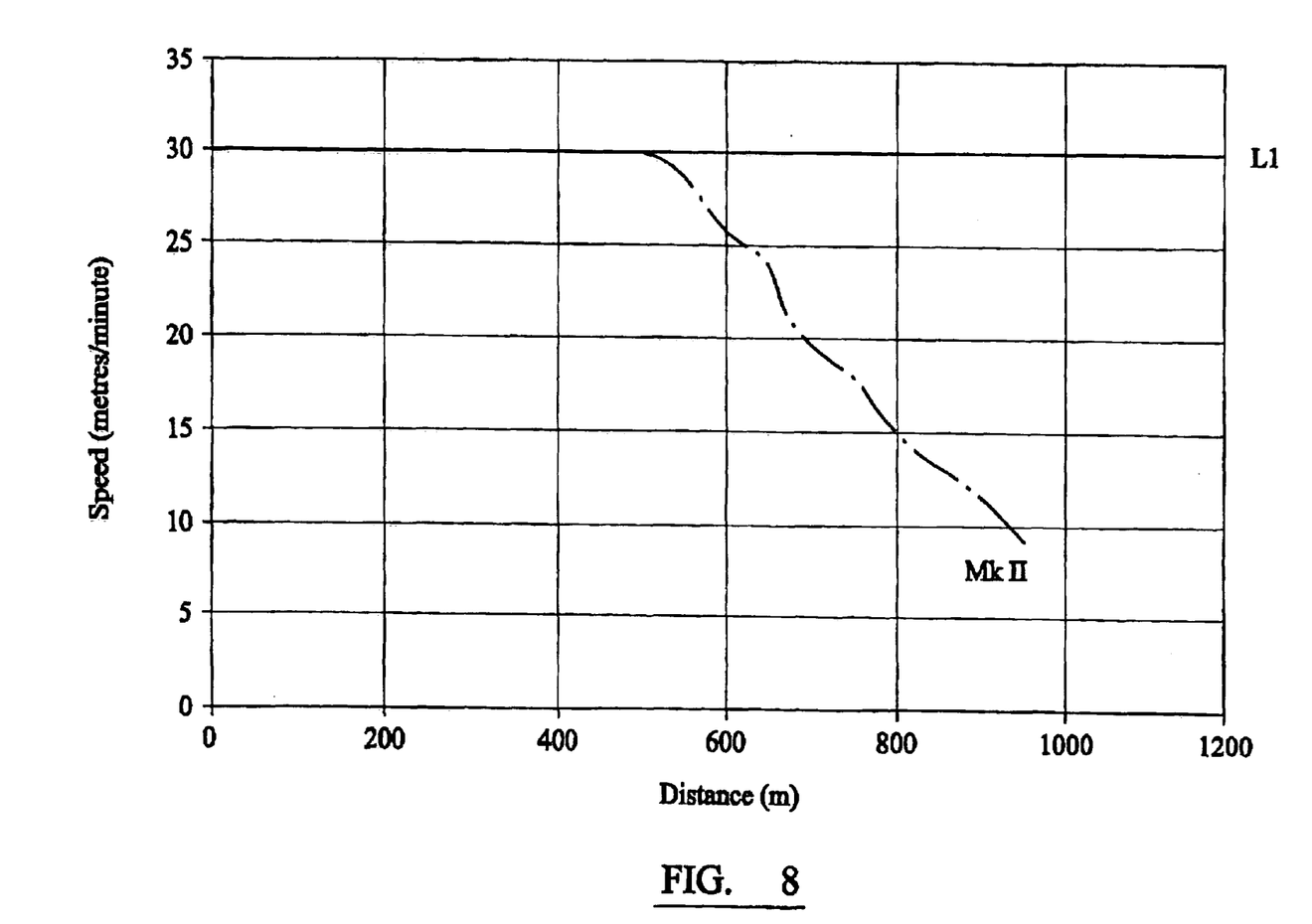
FIG. 8 is a graph of blowing performance in Comparative Example 2.

The results of blowing performance are shown in FIG. 8, from which it can be seen that the installation speed of the conventional MKII fibre unit started to decline after a blowing distance of approximately 500 m and was below 10 m per minute by the time 1000 m had been installed, whereas the cable 201 of the present invention had not suffered any appreciable reduction in installation speed after 1200 m. This shows that the replacement of relatively expensive coatings used in the conventional MKII cable by a low cost polypropylene sheath and a braided covering still dramatically improves the blowing performance of the cable. Since the cable of this embodiment of the invention is significantly less expensive to produce than the conventional MKII cable used, it can be seen that the present invention can be used to install fibre optic cables in a wider range of applications than would be economically practicable in the prior art.

It will be appreciated by persons skilled in the art that the above embodiments have been described by way of example only, and not in any limitative sense, and that various alterations and modifications are possible without departure from the scope of the invention as defined by the appended claims. For example, the present invention is not limited to fibre optic cables, and can also be used to install copper cables into ducts (i.e., a conductor for transmitting an electrical signal). With reference to FIG. 1, such a conductor can be used to form fibers 3. This enables copper cables to be blown into ducts over significantly longer distances and with a greater number of bends, and therefore in situations which would not be economically practicable in the prior art. Also, the textile fibres can be single fibre (i.e. monofilament) yarns or multifilament yarns formed from several individual fibres. In addition, it will be understood by persons skilled in the art that the cable can have a wide variety of arrangements of signal transmitting members, from a single signal transmitting member, to a plurality of such members arranged in a bundle of width comparable to its height, or in a ribbon of width greater than its height. Furthermore, the cable can include a single signal transmitting member enclosed in a sheath arranged between the signal transmitting member and the covering, or a plurality of such signal transmitting members one or more of which is enclosed in such a sheath.

What is claimed is:

1. A signal transmitting cable for installation in a duct by means of fluid flow, the cable comprising:
    a signal transmitting portion comprising at least one elongate, flexible, signal transmitting member; and
    a covering surrounding said signal transmitting portion, said covering forming an outer surface of said cable, said covering comprising crossed textile fibres.

2. A cable according to claim 1, wherein at least one of said at least one signal transmitting member comprises an optical signal transmitting member.

3. A cable according to claim 2, wherein at least one of said at least one signal transmitting member comprises an optical fibre.

4. A cable according to claim 1, wherein at least one of said at least one signal transmitting member comprises a conductor for transmitting an electrical signal.

5. A cable according to claim 1, wherein said covering comprises fibres selected from the group consisting of (a) fibres of different lateral thicknesses, (b) fibres of different diameters, (c) a mixture of fibres of substantially flattened and substantially circular cross sections, (d) braided fibres, (e) woven fibres, (f) knitted fibres.

6. A cable according to claim 1, wherein said textile fibres comprise at least one material selected from the group consisting of polyester and nylon.

7. A cable according to claim 1, further comprising at least one sheath surrounding at least one signal transmitting member.

8. A cable according to claim 1, wherein said at least one signal transmitting member comprises a plurality of signal transmitting members, and further comprising an adhesive layer arranged between at least one pair of adjacent said signal transmitting members.

9. A cable according to claim 1, wherein said covering is provided with a friction reducing coating.

10. A cable according to claim 1, wherein said fibres comprise a friction reducing coating.

11. A cable according to claim 1, wherein at least one of said fibres comprises a plurality of filaments.

12. A method of forming a signal transmitting cable for installation in a duct by means of fluid flow, the method comprising the step of:
    forming a covering around a signal transmitting portion comprising at least one elongate, flexible, signal transmitting member, wherein said covering forms an outer surface of the cable and comprises crossed textile fibres.

13. A method according to claim 12, wherein said step of forming said covering comprises braiding said textile fibres.

14. A method according to claim 12, wherein said step of forming said covering comprises at least one step selected from the group consisting of (a) forming said covering from textile fibres of different lateral thicknesses, (b) forming said covering from textile fibres of different diameters, and (c) forming said covering from a mixture of fibres of substantially flattened and substantially circular cross section.

15. A method according to claim 12, further comprising the step of providing said covering with a friction reducing coating subsequently to formation thereof.

16. A method according to claim 12, further comprising the step of providing at least some of said textile fibres with a friction reducing coating prior to formation of said covering.

* * * * *